July 12, 1949.    R. M. SMITH    2,475,997
HOLDING BRAKE FOR POWER TRANSMISSION
Filed Sept. 29, 1947    2 Sheets-Sheet 1
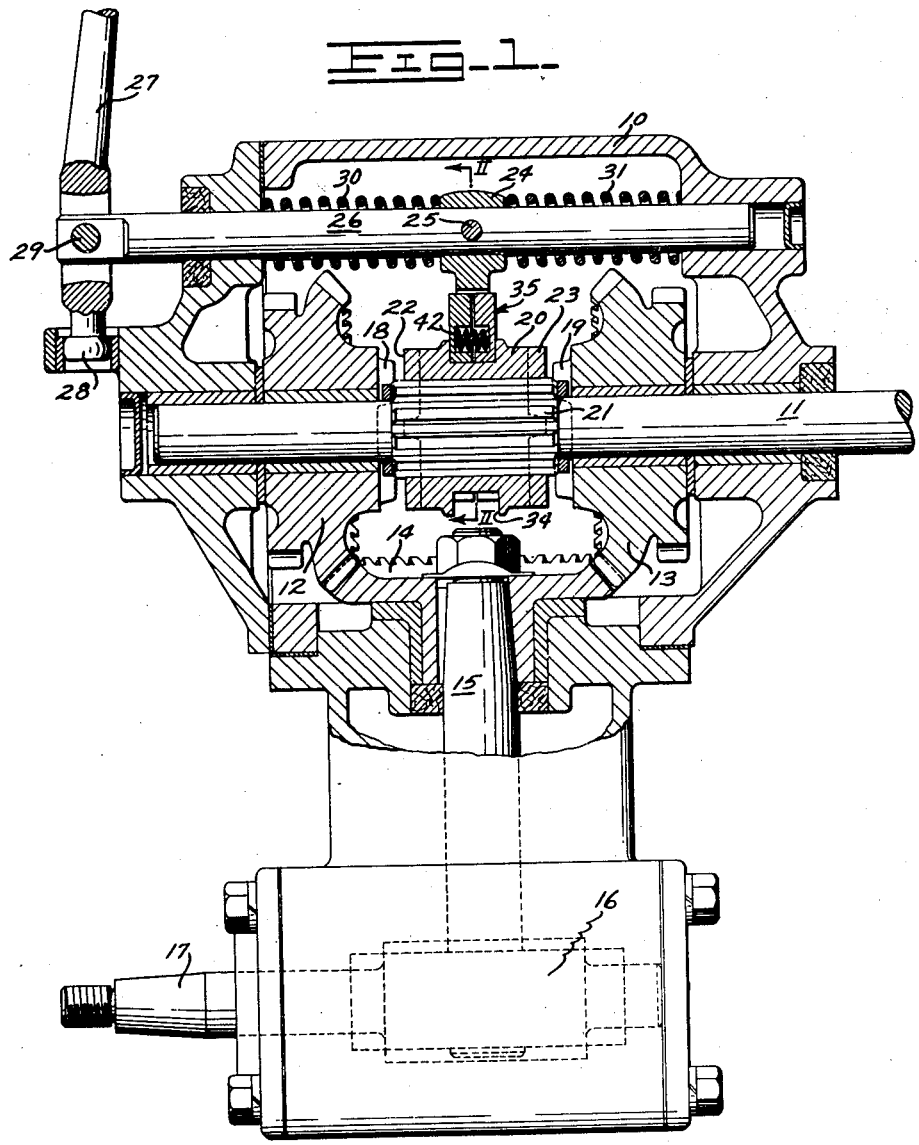
INVENTOR.
Roger M. Smith
BY Charles M. Fryer
ATTORNEY.

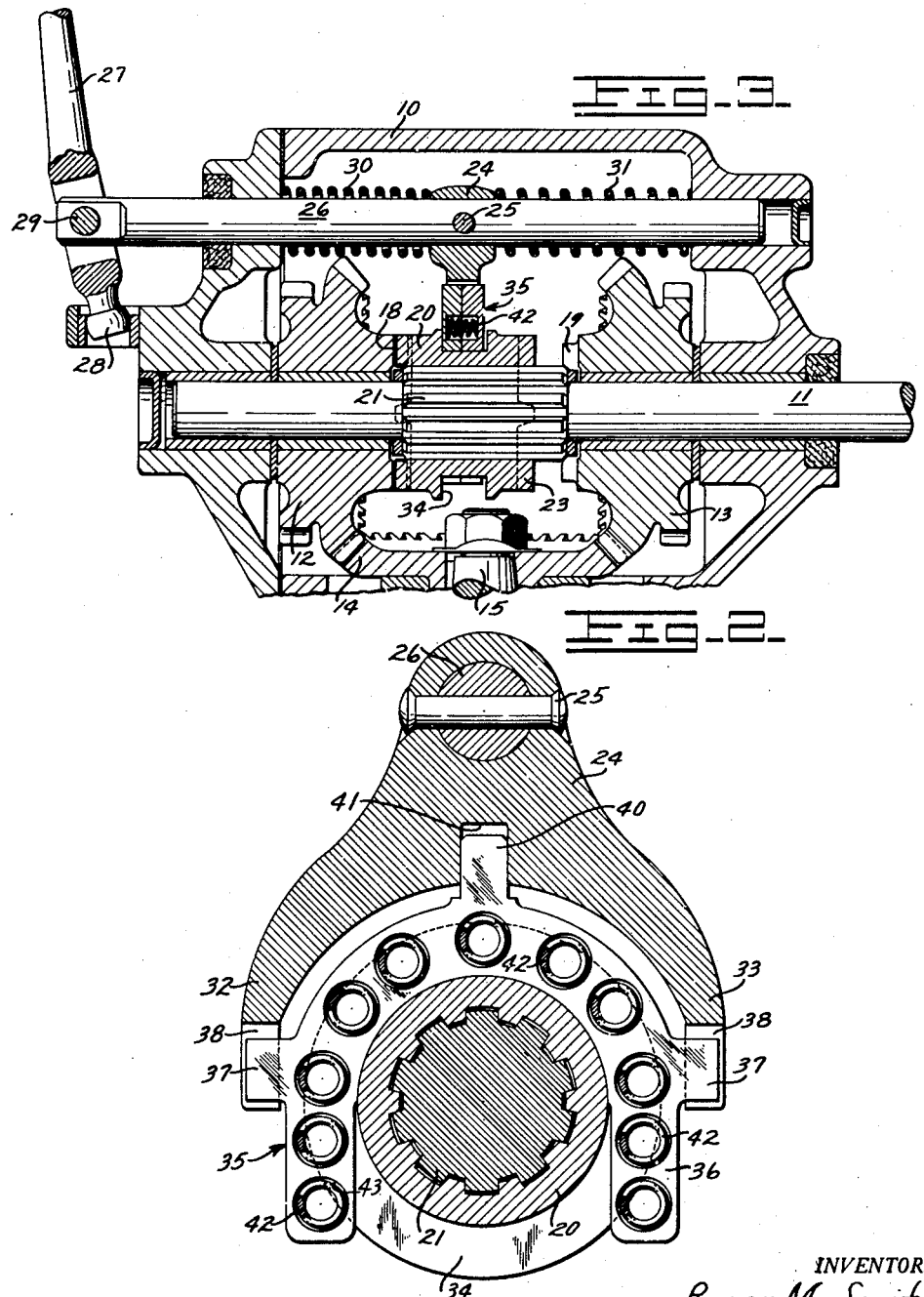

Patented July 12, 1949

2,475,997

UNITED STATES PATENT OFFICE 2,475,997

HOLDING BRAKE FOR POWER TRANSMISSION

Roger M. Smith, Phoenix, Ariz., assignor to Caterpillar Tractor Co., San Leandro, Calif., a corporation of California Application September 29, 1947, Serial No. 776,825

7 Claims. (Cl. 192—4)

This invention relates to a brake employed with a power transmission mechanism to prevent rotation of the transmission driven shaft except when it is intentionally connected through the transmission with the drive shaft.

The invention has been employed in connection with road grading machinery wherein various adjustments of the machine parts are effected by power taken from the prime mover of the machine and controlled by individual manually controlled transmissions. The following disclosure will, therefore, be directed to the invention in connection with such use though its adaptability to various other uses will be apparent as the description proceeds.

It is an object of the invention to provide an improved holding means for use with a power transmission mechanism wherein braking of the transmission driven shaft is automatically effected in neutral position but wherein the shaft is capable of rotation in either of two driving positions. Further and more specific objects and advantages of the invention as well as the details of its construction are made apparent in the following specification wherein reference is made to the accompanying drawings.

In the drawings:

Fig. 1 is a central vertical section through a transmission having a braking mechanism embodying the present invention;

Fig. 2 is an enlarged sectional view taken on line II—II of Fig. 1; and

Fig. 3 is a fragmentary view similar to Fig. 1 but illustrating a different position of the transmission parts and braking mechanism.

In Figs. 1 and 3 of the drawings, a transmission housing of conventional design is illustrated at 10 as containing a driven shaft 11 suitably journalled for rotation in the housing and extending outwardly through one side of the housing as shown where it will in practice be connected with some part to be controlled. Such part, for example, may be the scraper blade on a road grading implement, and mechanism will be employed for raising of the blade upon rotation of the driven shaft in one direction and lowering of the blade upon its rotation in the opposite direction. Rotary movement is imparted to the driven shaft 11 through either one of a pair of bevel gears 12 and 13 normally freely rotatable on the shaft and constantly driven in opposite directions by a meshing bevel gear 14. The gear 14 is carried on a stub shaft 15 which is connected as by worm gearing occupying the position indicated in dotted lines at 16 with a drive shaft 17. The drive shaft 17 is connected with a suitable power take-off shaft (not shown) of an internal combustion engine or other prime mover of the road grading machine. As the bevel gears 12 and 13 are constantly driven in opposite directions, connection of either one or the other of these gears with the driven shaft 11 will be effective to impart rotary movement to the driven shaft selectively in opposite directions. Each of the gears 12 and 13 is provided with a toothed clutch face as indicated at 18 and 19 respectively and a clutch shifting collar 20 is slidably but non-rotatably carried by the driven shaft 11 through the medium of a splined connection 21 as also shown in Fig. 2. The clutch collar is provided with toothed clutch faces 22 and 23 for engagement with the clutch faces 18 and 19 respectively of the gears 12 and 13.

In order to effect shifting of the clutch collar longitudinally of the shaft 11 selectively to engage its clutch faces with the gears 12 and 13, a shifting fork 24 is connected as by a pin 25 with a shifting rod 26 extending through and slidable with relation to the transmission housing. A manually controlled lever 27 disposed exteriorly of the housing is arranged to be rocked about a pivotal connection 28 and is connected as by a pin 29 with the shifting rod 26. Springs 30 and 31, interposed between the inner walls of the housing and the shifting fork 24, normally maintain the shifting fork in a central or neutral position with relation to the shifting collar 20 so that neither of the gears 12 or 13 are connected with the driven shaft 11. Swinging movement manually imparted to the lever 27, however, in either direction will compress one of the springs 30 or 31 and effect a driving connection between the shifting collar and one of the gears 12 or 13.

Ordinarily, the shifting fork 24 is provided with a pair of tines as indicated at 32 and 33 in Fig. 2, the lower ends of which would engage the shifting collar 20 by reception in an annular groove 34 formed therein. In accordance with the present invention, however, the tines of the shifting fork impart shifting movement to the collar 20 through an intermediate member in the form of a two-part yoke generally indicated at 35. The yoke 35 is made up of two separate inverted U-shaped members, one of which is shown at 36 in Fig. 2 and each of which is provided with a pair of outwardly extending ears 37 adapted to be received in the lower bifurcated ends 38 of the shifting fork tines 32 and 33. Each of the yoke members 36 is also provided with an upwardly extending lug 40 and these lugs are received in a notch 41 formed in the shifting fork for the purpose of preventing rotation of the yoke elements relative to each other and relative to the shifting fork. A plurality of expansible coil springs 42 are interposed between the two elements 36 of the yoke and are disposed in opposed recesses 43 formed in the abutting faces of the yoke parts for their reception.

When the transmission is in neutral position as illustrated in Fig. 1, the springs 42 tend to urge the yoke parts 36 outwardly or away from each other and into contact with the side walls of the annular groove 34 in the shifting collar 20. This contact effects a braking action against the shifting collar 20 and as the shifting collar is splined to the shaft 11 it prevents the rotation of this shaft which otherwise frequently occurs as a result of vibration and other conditions which are encountered during the operation of road grading machinery or the like. When the transmission is shifted as by moving the lever 27 to the left as indicated in Fig. 3 to effect movement of the shifting collar 20 to the left for engagement of its clutch face with the clutch face on the gear 12, the lower bifurcated ends 38 of the shifting fork 24 engage the ears 37 of one of the yoke members 36, in this case the right hand yoke member as viewed in Fig. 3. Consequently, the springs 42 are compressed so that the right hand member 36 is moved out of its breaking engagement with the shifting collar 20 and the entire yoke including both of the members 36 is moved in a direction longitudinally of the shaft 11 to slide the shifting collar thereon in the direction desired. The braking action between the yoke members and the shifting collar is in this manner materially reduced and is not sufficient to interfere materially with the drive of the shaft 11 through the transmission mechanism described. Likewise, movement of the shifting fork 27 in the opposite direction from its neutral position will effect release of the brake and shifting of the collar 20 for engagement with the opposite bevel gear 13. On release of the manual control lever 27 from either of its shifted positions, the springs 30 and 31 return it to and retain it in its normal or neutral position and the springs 42 between the yoke-like brake members are automatically effective to spread the brake members apart and into braking engagement with the shifting collar 20.

I claim:

1. In a power transmission comprising a driven shaft, a pair of gears rotatable thereon, and a grooved shifting collar rotatable with and slidable on the shaft to effect a driving connection with either of said gears, a shifting fork for sliding the collar and friction brake means interposed between the fork and the sides of the groove in the collar to prevent rotation of the driven shaft except when the collar is in driving position.

2. In a power transmission comprising a driven shaft, a pair of gears rotatable thereon, and a shifting collar rotatable with and slidable on the shaft to effect a driving connection with either of said gears, said collar having an annular groove therein, a shifting fork for sliding the collar, and a connection between the fork and the collar comprising a pair of yokes disposed in the collar groove, springs between said yokes for urging them into braking engagement with the sides of the groove, and means connecting the shifting fork and the yokes.

3. In a power transmission which includes a driven shaft and a sliding collar thereon for selectively connecting the shaft with either one of two driving gears, said collar having an annular groove, a pair of brake members disposed in the groove, springs between said brake members to urge them into braking contact with the sides of the groove, and a shifting fork having bifurcated tines embracing said brake members to compress said springs and effect sliding of the collar in either direction on the shaft.

4. In a power transmission which includes a driven shaft and a sliding collar thereon for selectively connecting the shaft with either one of two driving gears, said collar having an annular groove, a pair of brake members disposed in the groove, springs between said brake members to urge them into braking contact with the sides of the groove, and a shifting fork having bifurcated tines embracing said brake members to compress said springs and effect sliding of the collar in either direction of the shaft, and a connection between the fork and the brake members to hold the brake members against rotation with the collar.

5. In a shifting device for transmissions and the like which includes a grooved shifting collar and a fork associated with the groove for shifting the collar, brake means comprising a resilient assembly for imposing friction on the sides of the groove, and a connection between the fork and the brake means through which shifting movement may be imparted to the collar.

6. In a shifting device for transmissions and the like which includes a grooved shifting collar and a fork associated with the groove for shifting the collar, a pair of brake members engageable with opposite sides of the groove, resilient means urging said members into frictional contact with the sides of the groove, and a connection between the fork and the brake members for imparting shifting movement to the collar.

7. In a shifting device for transmissions and the like which includes a grooved shifting collar and a fork associated with the groove for shifting the collar, a pair of brake members engageable with opposite sides of the groove, resilient means urging said members into frictional contact with the sides of the groove, and a connection between the fork and the brake members for imparting shifting movement to the collar, said connection embracing both brake members to effect compression of said resilient means during shifting of the collar.

ROGER M. SMITH.

REFERENCES CITED

The following references are of record in the file of this patent:

UNITED STATES PATENTS

| Number | Name | Date |
|---|---|---|
| 1,971,955 | Hoelscher | Aug. 28, 1934 |
| 2,192,439 | Gustafsen | Mar. 5, 1940 |
| 2,208,518 | Ross | July 16, 1940 |